(12) United States Patent
Piscopo, Jr. et al.

(10) Patent No.: US 11,595,512 B2
(45) Date of Patent: *Feb. 28, 2023

(54) CALL SCREENING SERVICE FOR DETECTING FRAUDULENT INBOUND/OUTBOUND COMMUNICATIONS WITH SUBSCRIBER DEVICES

(71) Applicant: FIRST ORION CORP., North Little Rock, AR (US)

(72) Inventors: Robert Francis Piscopo, Jr., Kirkland, WA (US); Jefferson D. Stalnaker, Bellevue, WA (US)

(73) Assignee: FIRST ORION CORP., North Little Rock, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/177,077

(22) Filed: Feb. 16, 2021

(65) Prior Publication Data

US 2021/0203774 A1 Jul. 1, 2021

Related U.S. Application Data

(63) Continuation of application No. 16/731,002, filed on Dec. 30, 2019, now Pat. No. 10,924,609.

(51) Int. Cl.
| | |
|---|---|
| *H04M 1/66* | (2006.01) |
| *H04M 3/22* | (2006.01) |
| *H04M 3/42* | (2006.01) |
| *H04M 3/38* | (2006.01) |

(52) U.S. Cl.
CPC .......... *H04M 3/2281* (2013.01); *H04M 3/38* (2013.01); *H04M 3/42102* (2013.01); *H04M 2203/551* (2013.01); *H04M 2203/6027* (2013.01); *H04M 2207/18* (2013.01); *H04M 2250/60* (2013.01)

(58) Field of Classification Search
CPC .. H04M 3/2281; H04M 3/38; H04M 3/42102; H04M 2203/551; H04M 2203/6027; H04M 2207/18; H04M 2250/60
USPC ....................................................... 455/410
See application file for complete search history.

(56) References Cited

U.S. PATENT DOCUMENTS

| | | |
|---|---|---|
| 2007/0143422 A1 | 6/2007 | Cai |
| 2010/0124916 A1 | 5/2010 | Kim et al. |
| 2019/0335036 A1 | 10/2019 | Sharpe |
| 2020/0053205 A1 | 2/2020 | Sial et al. |

*Primary Examiner* — Temica M Beamer

(57) ABSTRACT

An example method of operation may include one or more of identifying an outbound call placed by a mobile device subscribed to a protected carrier network, determining the outbound call is destined for a destination telephone number that was stored in a call history of the mobile device, determining the destination telephone number is a scam call suspect telephone number based on one or more identified call filter parameters associated with the destination telephone number, and forwarding a scam call notification to the mobile device while the outbound call is dialing the destination telephone number.

20 Claims, 11 Drawing Sheets

450

CALL SCREENING SERVICE FOR DETECTING FRAUDULENT INBOUND/OUTBOUND COMMUNICATIONS WITH SUBSCRIBER DEVICES

CROSS-REFERENCE TO RELATED APPLICATIONS

This application is a continuation of U.S. patent application Ser. No. 16/731,002, filed on Dec. 30, 2019, now U.S. Pat. No. 10,924,609, issued on Feb. 16, 2021, the entire contents of which are hereby incorporated by reference.

This application relates to application Ser. No. 16/378,817, filed on Apr. 9, 2019, and entitled CALL SCREENING SERVICE FOR COMMUNICATION DEVICES, the entire contents of which are hereby incorporated by reference.

TECHNICAL FIELD OF THE APPLICATION

This application relates to call screening, and more specifically to a call screening service for detecting fraudulent inbound/outbound communications with subscriber devices.

BACKGROUND OF THE APPLICATION

Conventionally, mobile device users receive calls from undesired sources all the time, every day and sometimes every hour depending on the particular day. The source numbers which are used to dial the users may be local numbers, long-distance numbers, anonymous numbers, etc. The calls may be spam calls, scam calls, robocalls, etc. With recent advancements to call scam technologies, falsified/fraudulent call information may be transmitted to a recipient device, such as a smartphone subscriber of a particular carrier service. Such calls may be referred to as spoofed calls where the telephone number information sent to the carrier/subscriber identifies a different number that is not assigned to the calling party but which was used to fraudulent identify the calling party.

In-network calls and other communications may be those which are sent and received by common subscribers to a particular network. For example, a call sent from a subscriber of network carrier XYZ and received by a subscriber of network carrier XYZ. Out-of-network calls may be calls and other communications sent from one network carrier subscriber, such as an ABC network carrier subscriber to a different network carrier subscriber, such as an XYZ network carrier subscriber. Call spoofing can occur both in-network and out-of-network and may identify telephone numbers which are both in-network and out-of-network. This complicates the call management procedures used to minimize the amount of fraudulent and scam calls. Ultimately, the number of scam calls sent and received need to be reduced to limit the amount of fraud/scam occurring on any carrier's network and to protect the subscribers.

Additionally, call scams may attempt to entice a mobile device user to actively call a telephone number, such as a voicemail, a missed call to a spoofed telephone number, etc. Scam calls are also created to steal information, money, etc., from mobile device users who identify a missed call and call that telephone number back. In some cases, the callback may invoke a reverse international call price by the minute that then is billed to those mobile device subscribers via their own carrier network. Reducing the number of calls, or at least intercepting those calls, made by mobile device users to scam caller entities is necessary to reduce the amount of fraud and scam call activities.

SUMMARY OF THE APPLICATION

Example embodiments of the present application provide a method including one or more of identifying an inbound call intended for a mobile device subscribed to a protected carrier network, determining the inbound call is assigned an origination telephone number that is subscribed to the protected carrier network, determining whether an inbound call origination source location indicates the protected carrier network or an out-of-network carrier network based on one or more call parameters received with the inbound call, and determining whether to transmit an indication to the mobile device that the inbound call has an elevated likelihood of being a scam call based on the inbound call origination source location.

Another example embodiment may include an apparatus that includes a processor configured to identify an inbound call intended for a mobile device subscribed to a protected carrier network, determine the inbound call is assigned an origination telephone number that is subscribed to the protected carrier network, determine whether an inbound call origination source location indicates the protected carrier network or an out-of-network carrier network based on one or more call parameters received with the inbound call, and determine whether to transmit an indication to the mobile device that the inbound call has an elevated likelihood of being a scam call based on the inbound call origination source location, and a transmitter configured to transmit the indication to the mobile device when the inbound call has an elevated likelihood of being a scam call.

Still another example embodiment may include a non-transitory computer readable storage medium configured to store instructions that when executed cause a processor to perform one or more of identifying an inbound call intended for a mobile device subscribed to a protected carrier network, determining the inbound call is assigned an origination telephone number that is subscribed to the protected carrier network, determining whether an inbound call origination source location indicates the protected carrier network or an out-of-network carrier network based on one or more call parameters received with the inbound call, and determining whether to transmit an indication to the mobile device that the inbound call has an elevated likelihood of being a scam call based on the inbound call origination source location.

Still yet a further example embodiment may include a method that includes identifying an outbound call placed by a mobile device subscribed to a protected carrier network, determining the outbound call is destined for a destination telephone number that was stored in a call history of the mobile device, determining the destination telephone number is a scam call suspect telephone number based on one or more identified call filter parameters associated with the destination telephone number, and forwarding a scam call notification to the mobile device while the outbound call is dialing the destination telephone number.

Still a further example embodiment may include an apparatus that includes a processor configured to identify an outbound call placed by a mobile device subscribed to a protected carrier network, determine the outbound call is destined for a destination telephone number that was stored in a call history of the mobile device, determine the destination telephone number is a scam call suspect telephone number based on one or more identified call filter parameters associated with the destination telephone number, and a transmitter configured to forward a scam call notification to the mobile device while the outbound call is dialing the destination telephone number.

Still a further example embodiment may include a non-transitory computer readable storage medium configured to store instructions that when executed cause a processor to perform one or more of identifying an outbound call placed by a mobile device subscribed to a protected carrier network, determining the outbound call is destined for a destination telephone number that was stored in a call history of the mobile device, determining the destination telephone number is a scam call suspect telephone number based on one or more identified call filter parameters associated with the destination telephone number, and forwarding a scam call notification to the mobile device while the outbound call is dialing the destination telephone number.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide call management of calls inbound and destined for a subscriber device, such as a mobile device that is operating on a protected carrier network that is being monitored for call screening purposes to reduce scam and undesired calls. Other embodiments provide call management for call screening purposes of outbound calls initiated from the subscriber device and destined for potential call scam locations. For example, calls to international and other types of carrier networks may invoke reverse charges which are billed to the subscriber's carrier network when the subscriber attempts to call certain scam call origination entities.

Figure 1A:
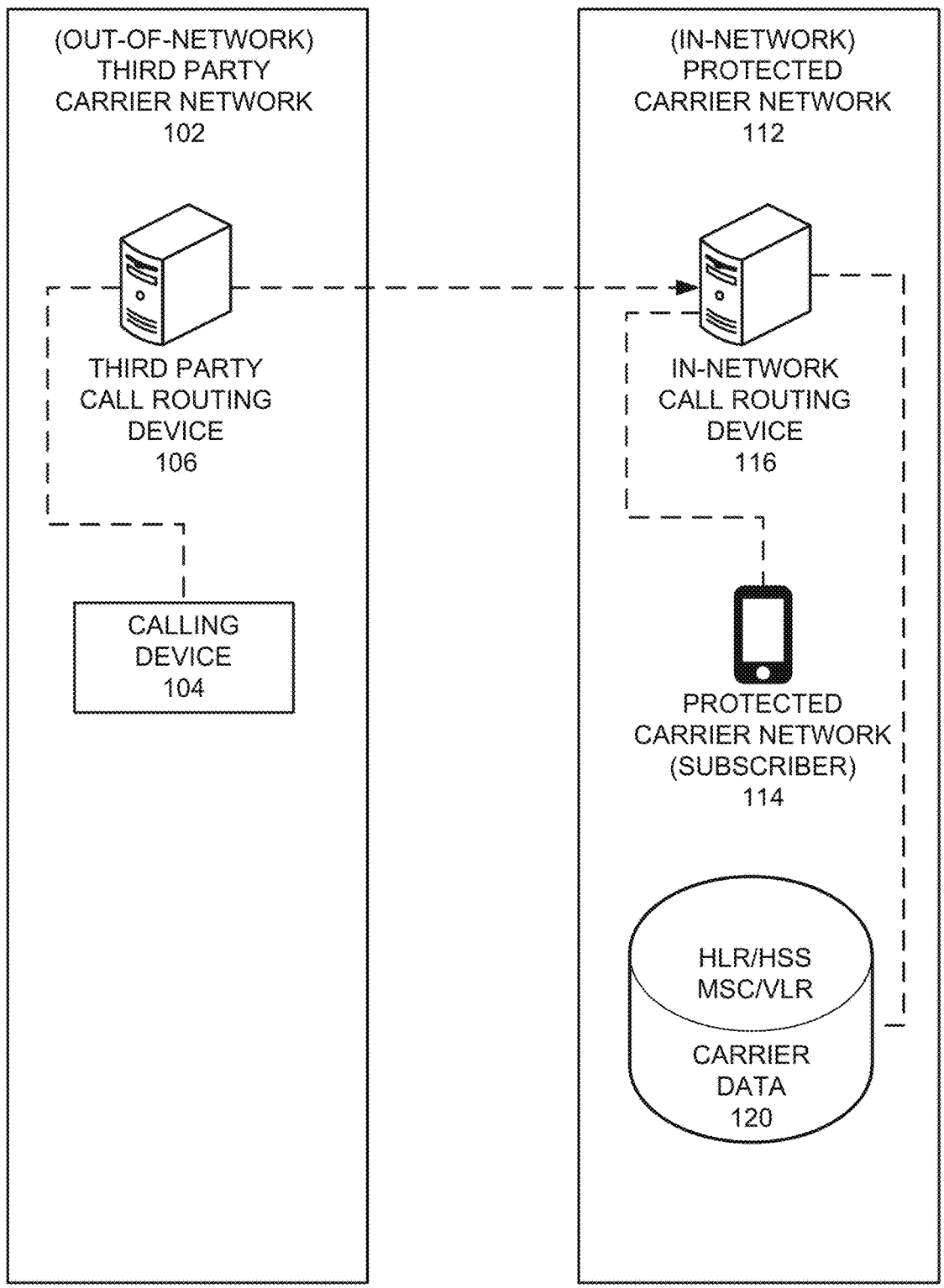
FIG. 1A illustrates an example call management network configuration for an inbound call according to example embodiments.

FIG. 1A illustrates an example call management network configuration for an inbound call according to example embodiments. Referring to FIG. 1A, the configuration 100 provides an example where a calling entity, such as calling device 104 is calling from an out-of-network third party carrier service 102. The call may be routed from a third party call routing device 106 and may have attempted to wrongfully use an origination telephone number that is assigned to the in-network carrier network 112, such that the calling party origination number is recognized by the in-network carrier network 112 as a subscriber regardless of whether the telephone number has been wrongfully assigned to the call by the calling party (i.e., spoofed telephone number).

In operation, when attempting to determine whether the call includes a telephone origination number that is a valid in-network originated call or an invalid in-network originated call which is actually from another network, the in-network call routing device will receive the call or call message data, such as in the case of digital packet call data (e.g., SIP), and determine whether the call should be routed to the intended destination device 114, blocked, or whether a notification should be used to assist the subscriber with scam detection (i.e., scam likelihood indicator).

As the call is received by the in-network protected carrier network 112, a call routing device, such as a call server may identify the calling party telephone number and perform a service profile identifier (SPID) lookup and/or an operating company number (OCN) lookup to match the calling entity telephone number to the protected carrier network whether or not the assignment is valid or not, at this step, the objective is just to determine whether the assigned origination telephone number is attempting to be identified as part of the carrier network 112 subscription group. Confirming the origination telephone number is owned/managed by the protected carrier network 112 provides a particular approach to confirming the validity of such a telephone number.

After the origination telephone number is confirmed to belong to the carrier network 112, the in-network server 116 may attempt to perform a lookup via the home subscriber service (HSS) or the home location register (HLR) to identify whether that telephone number has been assigned to another network and whether that user is actually roaming in another network. Such a query can be performed via a LDAP command query to the HLR/HSS to identify a roaming status of the calling device. When the roaming status indicates the calling device is roaming, the device may be confirmed to be a valid in-network device and absent any other call filtering criteria indicating that the call may be a scam call, the call may be routed to the destination device 114 accordingly.

In the event that the calling device is identified as not roaming based on confirmation via the HLR/HSS query attempt, the call may be identified as potential scam based on the fact that the telephone number is assigned to the protected carrier network, the call came from a third party device and the call is not actively roaming in any other network. The confirmation that the call came from outside the network m ay be based on another simple procedure for identifying the base station or base station controller where the call was sent from is not part of the carrier network base stations known and stored in a list of carrier network devices, such a list may use names, identifiers, IP addresses, location information, etc., to maintain a list of the network devices which are part of the carrier network.

Additionally, the lack of evidence that the home network is part of the call information may be further confirmed based on the mobile switching center (MSC)/visitor location register (VLR) information identified. Since the public land mobile network (PLMN) used to route the call is not owned by the carrier network, the call is quickly identified as improperly addressed (i.e., the telephone number used is not valid). The call may be dropped, blocked, and/or a notification may be sent to the recipient 114 to confirm the call has an elevated likelihood of scam and should be disregarded. Subscriber and/or other carrier network data 120 may be used to store historical calling information about the subscriber, the caller entities, etc., so a history can be stored and used to override certain call scam filters if necessary based on call history for a particular subscriber 114.

Figure 1B:
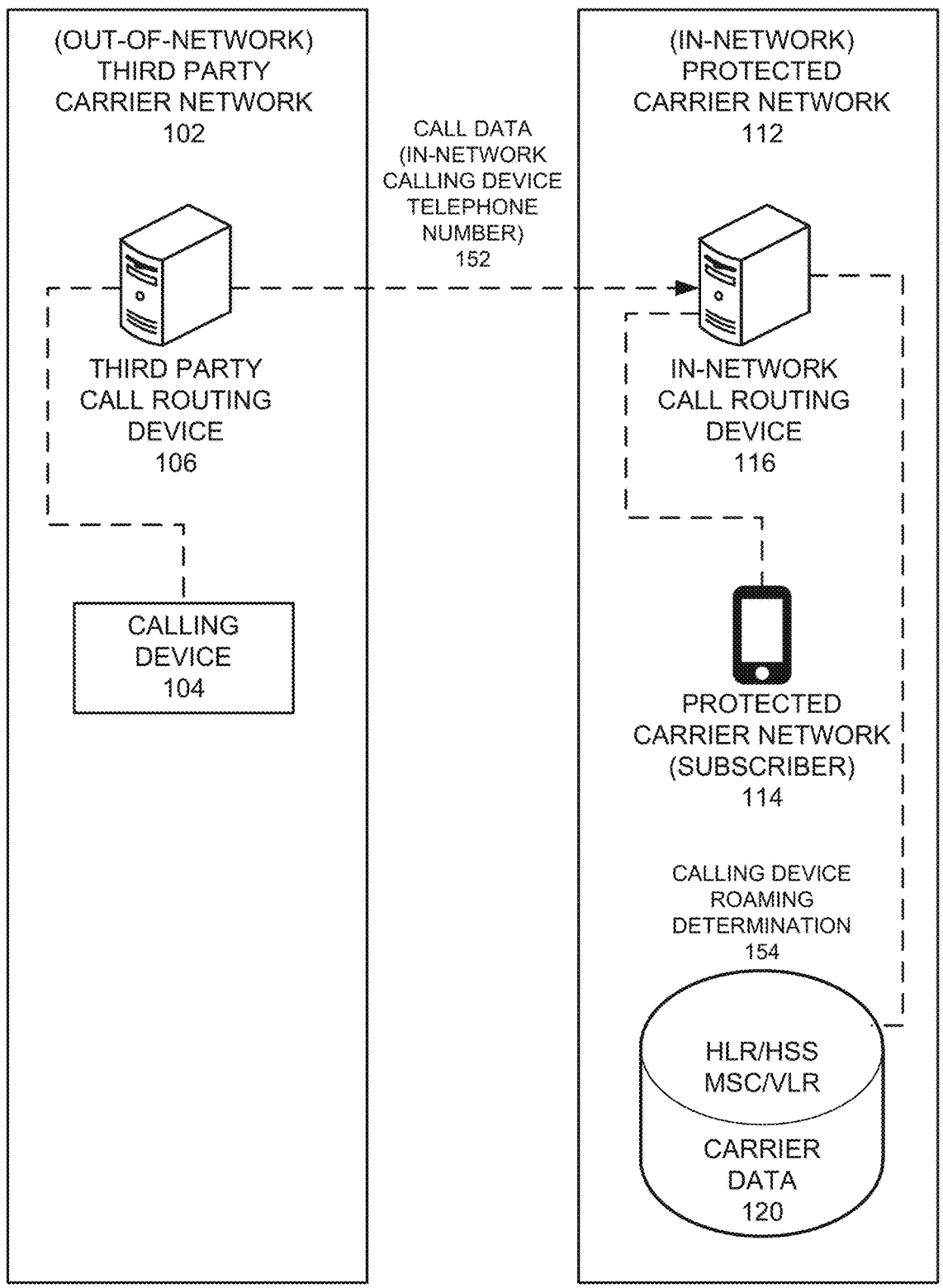
FIG. 1B illustrates a detailed example of a call management network configuration for an inbound call according to example embodiments.

FIG. 1B illustrates a detailed example of a call management network configuration for an inbound call according to example embodiments. Referring to FIG. 1B, the example configuration 150 provides identifying an inbound call intended for a mobile device subscribed to a protected carrier network and the inbound call has an origination number that identifies the subscriber network of the recipient device 152. The process provides determining the inbound call is assigned an origination telephone number that is subscribed to the protected carrier network, determining whether an inbound call origination source location indicates the protected carrier network or an out-of-network carrier network based on one or more call parameters received with the inbound call, such information may be identified from the MSC/VLR associated with the calling entity and the call data received with the call. The process further includes determining whether to transmit an indication to the mobile device subscriber 114 that the inbound call has an elevated likelihood of being a scam call based on the inbound call origination source location.

When determining whether the inbound call originated from the protected carrier network 112 or an out-of-network carrier network 102, the process provides determining whether the one or more call parameters identify an origination device address registered with the protected carrier network or with the out-of-network carrier network. When the origination device address is registered at an out-of-network carrier network, the process determines whether the inbound call is assigned to a subscriber telephone number actively roaming in the out-of-network carrier network. This is performed by initiating a lightweight directory access protocol (LDAP) query to identify whether the subscriber telephone number is actively roaming or not 154 via the status assigned to the HLR/HSS. When the subscriber telephone number is identified as not actively roaming, the inbound call will have an elevated likelihood of being a scam call since the calling device number is falsely indicating the carrier network 112 and is actually from another network carrier. When the subscriber telephone number is identified as not actively roaming, the method may also include creating a call block rule for a predefined period of time (e.g., 1, 2, 10 minutes), and the call block rule blocks all inbound calls assigned to the subscriber telephone number received at the protected carrier network 112.

Figure 2A:
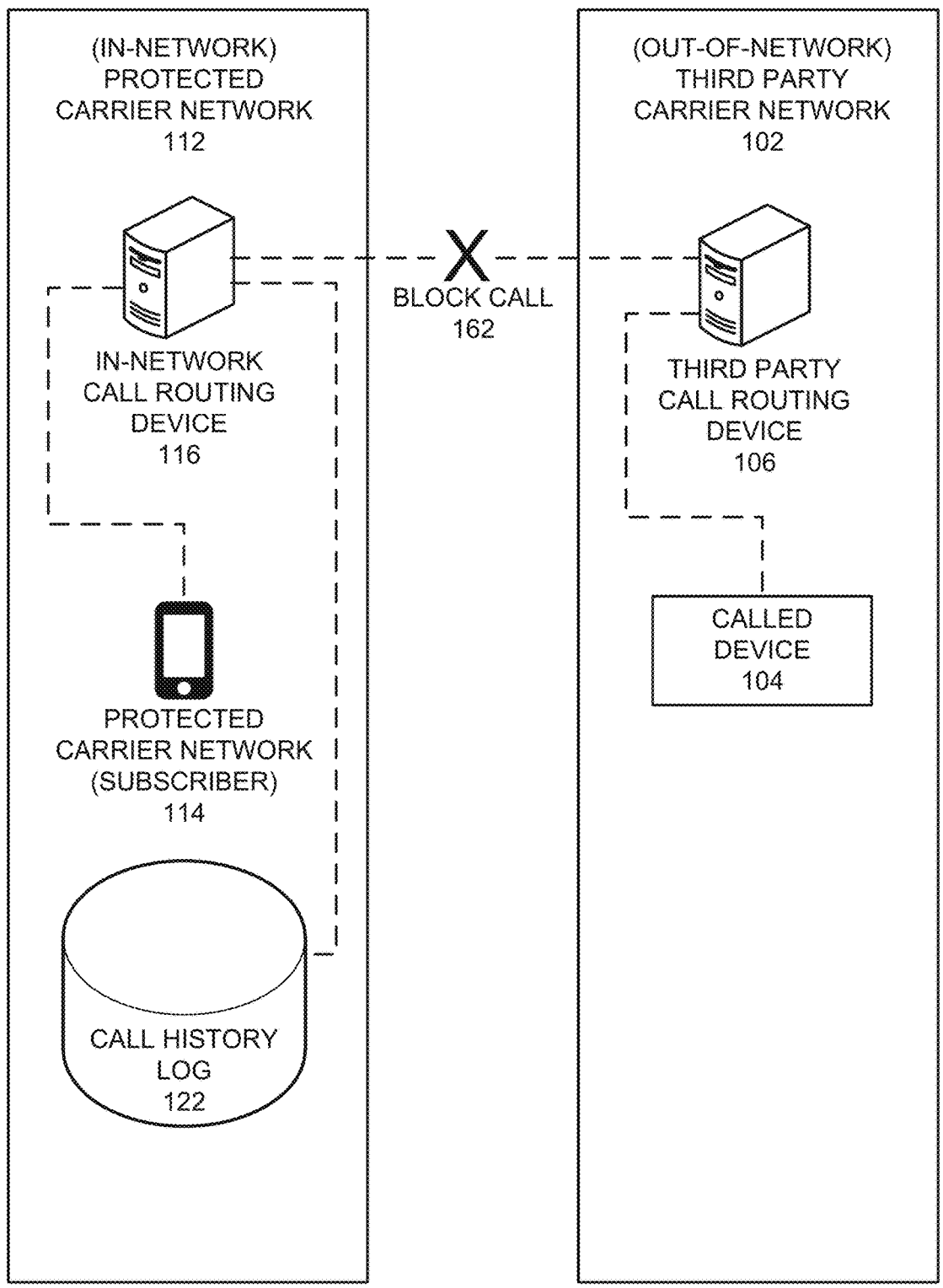
FIG. 2A illustrates an example call management network configuration for an outbound call according to example embodiments.

FIG. 2A illustrates an example call management network configuration for an outbound call according to example embodiments. Referring to FIG. 2A, the configuration 200 includes the protected carrier network 112 monitoring subscriber calls both inbound and outbound and the third party network 102 as an example of another carrier network and device. In this example, the concern is with outbound calls made by subscribers to suspicious/suspect entities which are known and used as the basis for call monitoring/filtering procedures. For example, when a protected subscriber device 114 attempts to call a telephone number that is associated with a likely scam entity, the call may be identified and blocked 162 or supplemented with a notification to the subscriber device 114 indicating the known risk.

Criteria used to identify call parameters as high risk and belonging to certain suspect entities may include telephone numbers which require a country code (i.e., international), known traffic generating numbers, rural carrier numbers which are linked to caller cost requirements or well known scam numbers identified from any of a number of screening/baselining operations used to identify such numbers over a period of time.

Another strategy to identify whether the outbound call should be screened is whether the calling device has the outbound dialed telephone number in their recent history information, such as a recent call. If the calling subscriber device 114 has the outbound call, that is currently being dialed, stored in the device history/memory one time in a predefined period of time (e.g., 24 hours), then the outbound call may be screened for any corresponding scam records associated with the telephone number. This approach takes into consideration that a subscriber may be attempting to call back a missed call that is stored in their device call history and that dialed telephone number may connect to a billing service of the third party network 102 which causes charges to incur with the carrier network 112 since the call recipient is located in a network that extends costs to the subscriber's network when called.

Any outbound call that has the called telephone number in the calling device's memory history list a predetermined number of times and/or over a period of time (e.g., 3 times or more, over 48 hours of time, etc.) may be excluded from the scam potential screening since the called number is likely someone the caller knows and trusts. One entry in a short term period of time is quite significant as a potential scam number as compared to a number that was received and/or called multiple times over a longer period of time.

One example process may include identifying an outbound call placed by a mobile device 114 subscribed to a protected carrier network 112, determining the outbound call is destined for a destination telephone number that was stored in a call history log 122 of the mobile device, determining the destination telephone number is a scam call suspect telephone number based on one or more identified call filter parameters associated with the destination telephone number (e.g., international number, known scam telephone number, area code of recent scam calls, etc.), and forwarding a scam call notification to the mobile device while the outbound call is dialing the destination telephone number. This may be a window to drop the call, a 'whisper' that interrupts the call and plays a recording, such as "this is likely a scam call", if you hang up now it will not connect, if you stay on the line for 5 more seconds, the call will connect".

The process may also include determining whether the destination telephone number that was just dialed in the outbound call has additional instances stored in the call history of the mobile device. In one example, when a number of the additional instances meets or exceeds a threshold number of stored telephone number history instances in the call history of the mobile device, the outbound call may be permitted to connect and the scam call notification may be blocked or revoked. When determining the destination telephone number is a scam call suspect telephone number based on one or more call filtering parameters, one approach may be to determine the destination telephone number was identified in inbound calls received a threshold number of times in a threshold amount of time by the protected carrier network. This way, the telephone number may be counted each time it enters the network to trigger a call filter action, such as adding that telephone number to a list of suspect numbers. The one or more identified call filter parameters used to further screen the telephone number as scam may include one or more of a calling telephone number, an IP address of the calling device and an IP address of one or more network devices forwarding call requests comprising the calling telephone number. All such information may be used to categorize the telephone number as scam.

Continuing with the same process, responsive to forwarding the scam call notification to the mobile device while the outbound call is dialing the destination telephone number, the outbound call may be blocked 162 from connecting with the destination telephone number. Also, the destination telephone number stored in the call history may not be assigned to a calling device which placed the call to the mobile device but may instead be a fake telephone number that was manipulated (i.e., spoofed) by the calling device (e.g., landline, PBX, automated calling machine).

Another call filter criteria used to identify a potential scam caller may be calls which ring once and drop the call, such calls may not receive confirmation responses, such as 200 OK messages as in the case of SIP. Those abandoned calls may be flagged as potential scam since the confirmation messages were not received and the telephone number used may be associated with multiple instances of the non-confirmed calls which were sent and identified and which did not log a confirmation of connection.

Figure 2B:
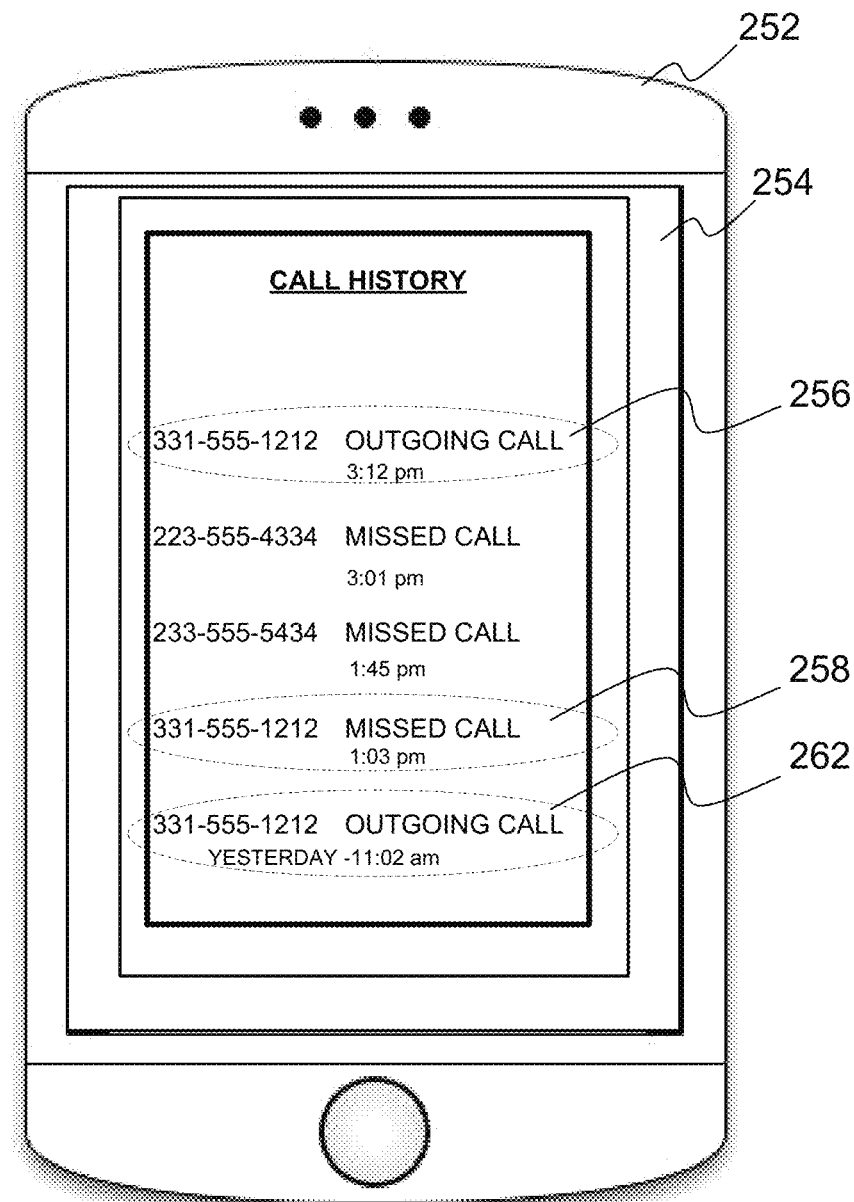
FIG. 2B illustrates an example of a preserved call history record of calls identified for an outbound call management configuration according to example embodiments.

FIG. 2B illustrates an example of a preserved call history record of calls identified for an outbound call management configuration according to example embodiments. In this example configuration 250, the subscriber device 252 may include a call history interface 254 which logs the incoming and outgoing call data. The telephone number 331-555-1212 may be identified at various times 256, 258 and 262 over a period of time, which may be in this example of just over 24 hours. The various instances and the period of time (e.g., 24 hours) may cause the telephone number to be excluded from a suspect list of numbers since the subscriber has called the number and received calls from the number at various times (e.g., three times) in the period of time. This period of time may be compared to a threshold period of time to identify whether the number has been called or calls have been received from that number during that time period.

Figure 2C:
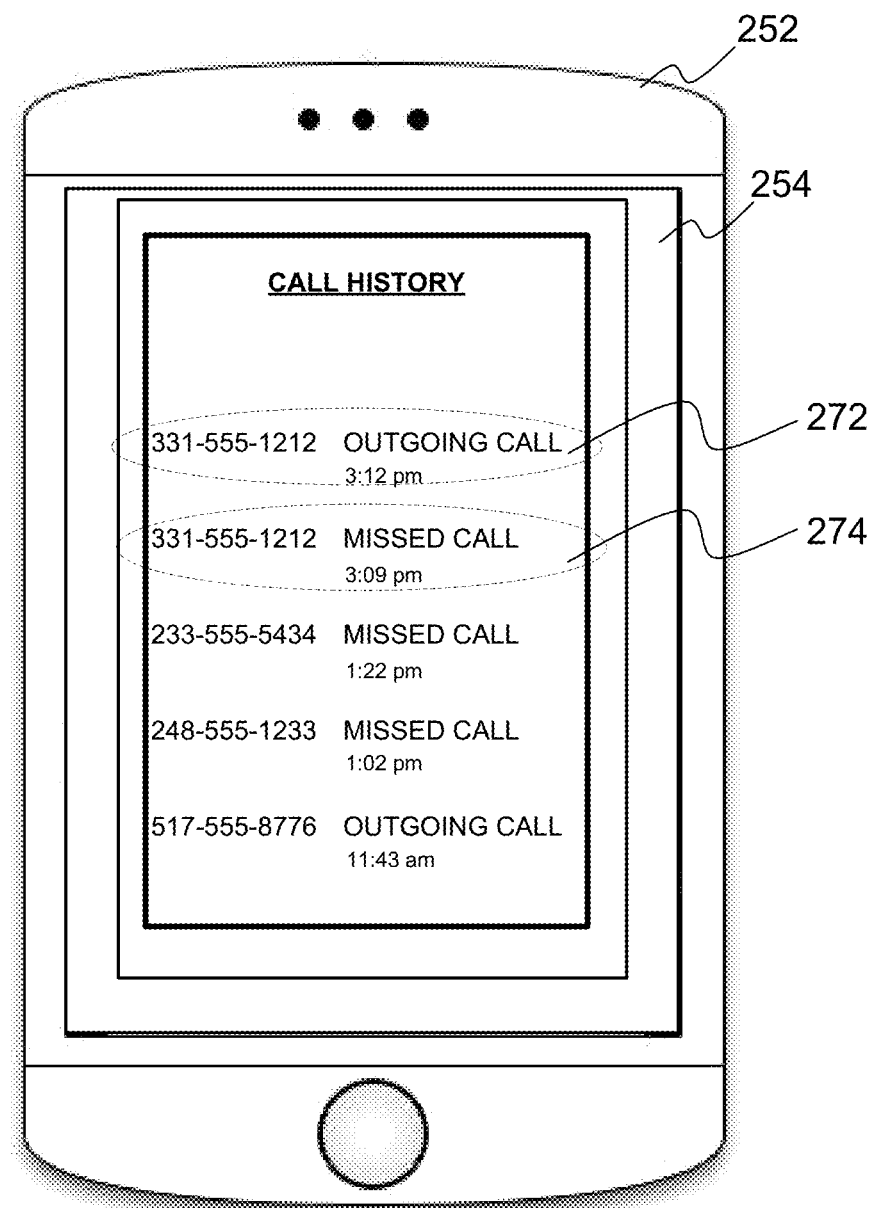
FIG. 2C illustrates an example call history of newly received calls identified for an outbound call management configuration according to example embodiments.

FIG. 2C illustrates an example call history of newly received calls identified for an outbound call management configuration according to example embodiments. Referring to FIG. 2C, the example 270 demonstrates an example where the missed call 274 and the outgoing call 272 to the same number have no other call history. The missed call and any other call filtering criteria, such as a black list of numbers suspected to be scams and/or a lack of a call confirmation message may be used as criteria to alert the caller of the potential for scam.

Figure 3A:
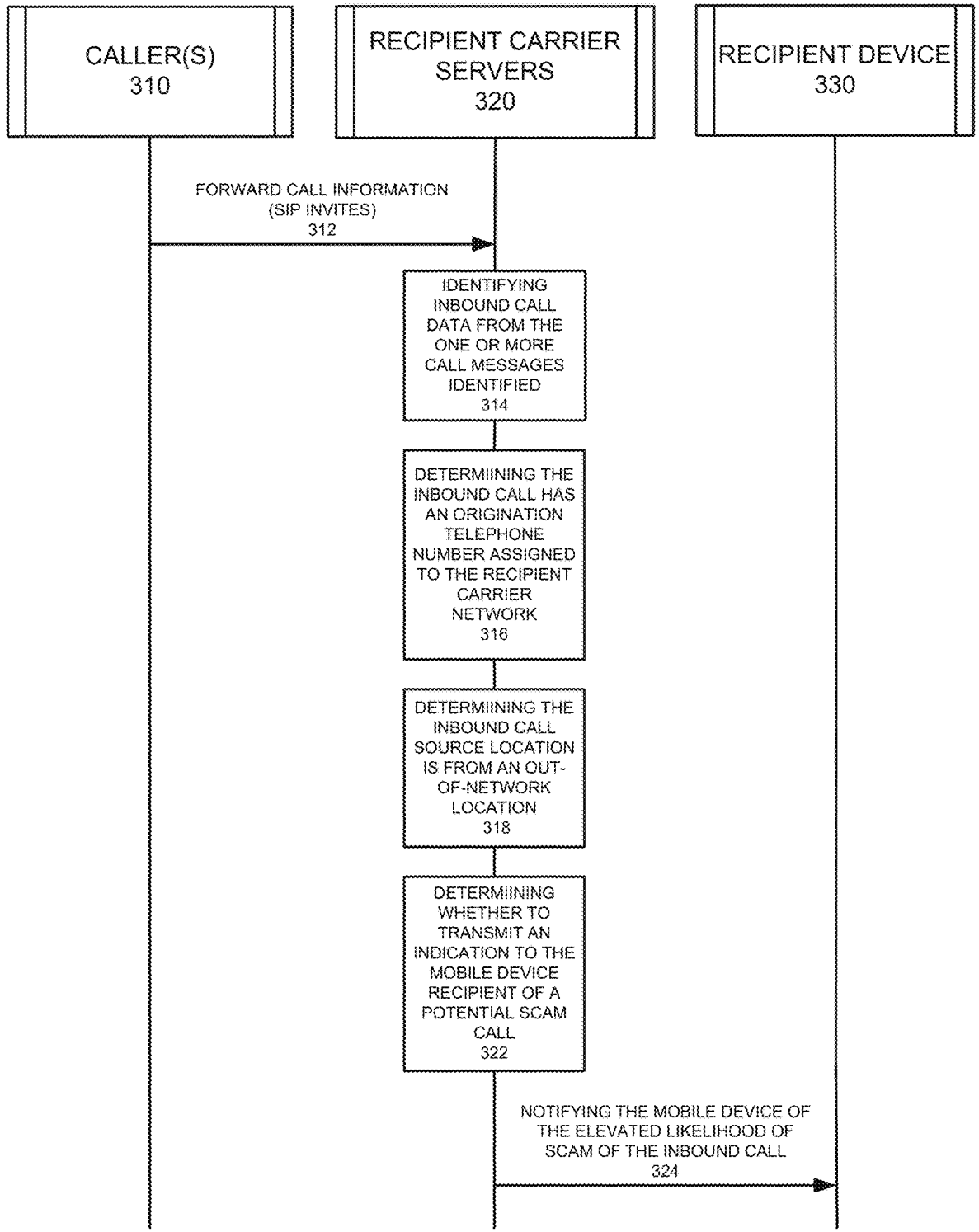
FIG. 3A illustrates a call management system configuration for processing an inbound call according to example embodiments.

FIG. 3A illustrates a call management system configuration for processing an inbound call according to example embodiments. Referring to FIG. 3A, the system 300 provides a caller 310 from a third party caller network that is attempting to call a recipient device 330, which may be managed by a recipient carrier server(s) 320. The call is received 312 and processed to identify the source and destination information. The call is an inbound call destined for a subscriber device managed by the recipient carrier network as identified from the call data 314. The call is identified as having an origination telephone number that is assigned 316 to the recipient carrier network even thought the call may be a spoof number assigned to a non-carrier network member. The inbound call source location may be identified to identify whether the call was sent from a local carrier base station/controller or other cellular network based call entity 318. An indication may be sent to the mobile device recipient if the call is identified to be a scam call 322 based on the call network information, whether the call is roaming or not, etc. The mobile device may be notified 324 in the event that the call is determined to have an elevated likelihood of being scam.

Figure 3B:
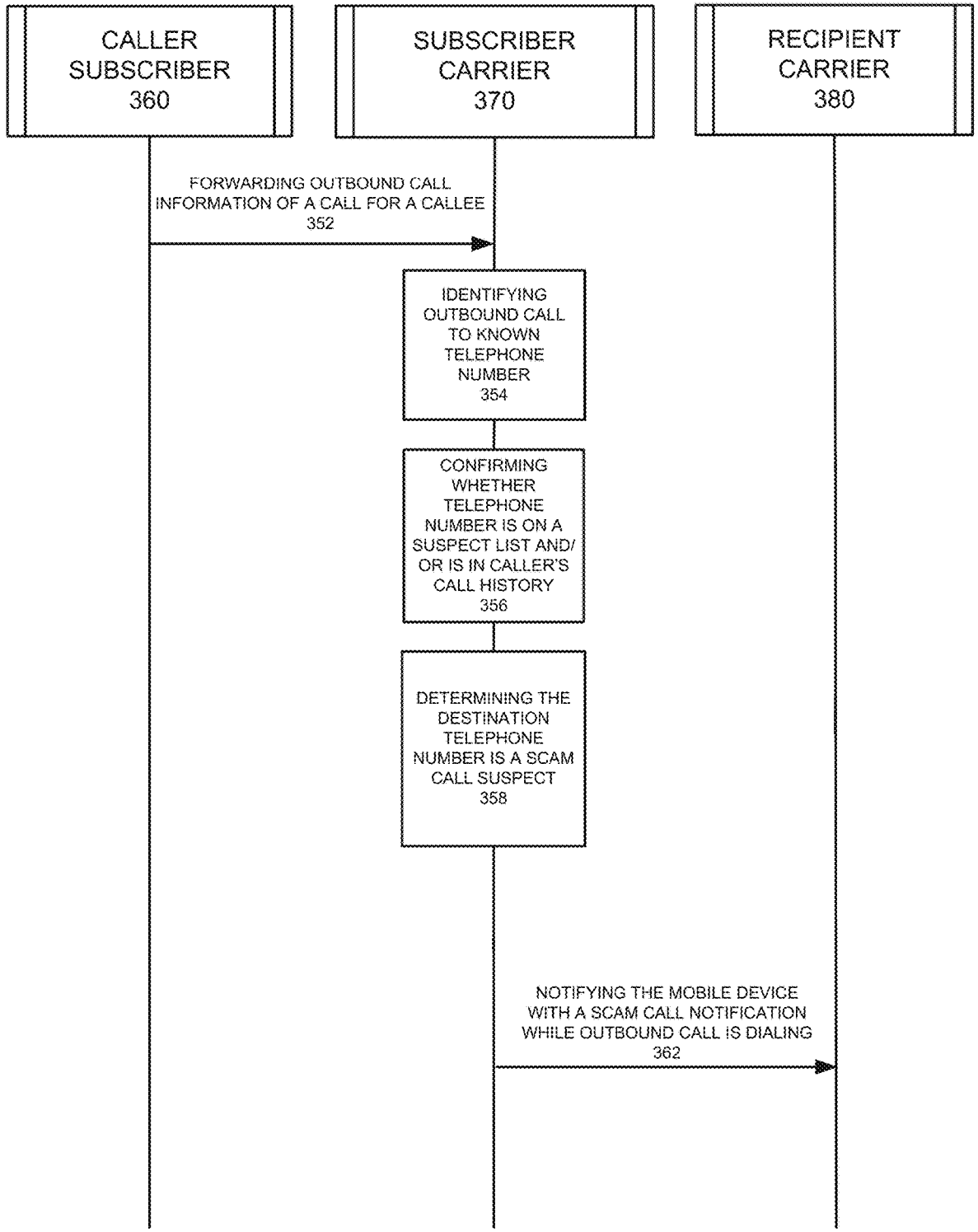
FIG. 3B illustrates a call management system configuration for processing an outbound call according to example embodiments.

FIG. 3B illustrates a call management system configuration for processing an outbound call according to example embodiments. Referring to FIG. 3B, in this configuration 350, the caller is the subscriber 360 to the subscriber carrier network 370 and the recipient carrier 380 is the carrier network that receives and processes the outbound call sent from the caller subscriber 360. In this example, the forwarding of the outbound call information of the call sent from the caller is destined for a callee 352. The call being initiated is identified by the caller/subscriber carrier network server 370 as being an outbound call to a known telephone number 354. The number may be known by cross-referencing a list of numbers which are known to be suspect numbers responsible for previous scam activities. Also, the number dialed may be identified as a particular region or type of number that is associated with scam call entities. The caller's history may also be referenced to identify a relative level of activity between the caller and the callee 356. If the destination is identified as a scam call suspect 358, then the appropriate action may be taken to limit the caller's chances of directly connecting with the scam call entity by attempting to persuade the caller to hang up or not complete the call. A notification may be sent while the outbound call is dialing 362, the notification may indicate the call is likely to a scam entity.

Figure 4A:
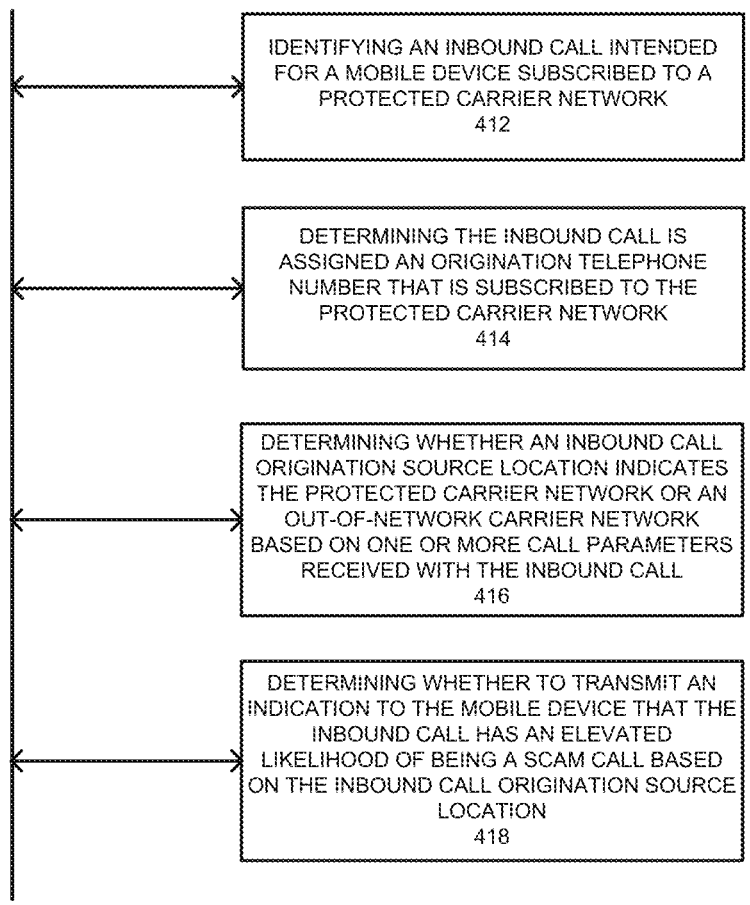
FIG. 4A illustrates an example flow diagram of a process for managing inbound calls according to example embodiments.

FIG. 4A illustrates an example flow diagram of a process for managing inbound calls according to example embodiments. Referring to FIG. 4A, the method 400 may include identifying an inbound call intended for a mobile device subscribed to a protected carrier network 412, determining the inbound call is assigned an origination telephone number that is subscribed to the protected carrier network 414, determining whether an inbound call origination source location indicates the protected carrier network or an out-of-network carrier network based on one or more call parameters received with the inbound call 416, and determining whether to transmit an indication to the mobile device that the inbound call has an elevated likelihood of being a scam call based on the inbound call origination source location 418.

Figure 4B:
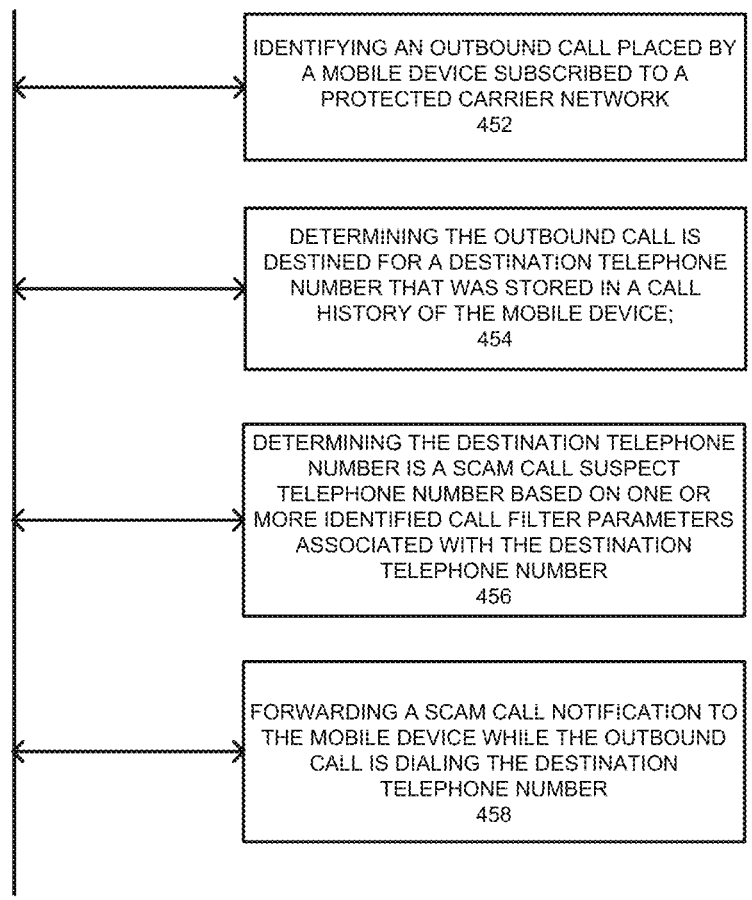
FIG. 4B illustrates an example flow diagram of a process for managing outbound calls according to example embodiments.

FIG. 4B illustrates an example flow diagram of a process for managing outbound calls according to example embodiments. Referring to FIG. 4B, the method 450 may provide identifying an outbound call placed by a mobile device subscribed to a protected carrier network 452, determining the outbound call is destined for a destination telephone number that was stored in a call history of the mobile device 454, determining the destination telephone number is a scam call suspect telephone number based on one or more identified call filter parameters associated with the destination telephone number 456, and forwarding a scam call notification to the mobile device while the outbound call is dialing the destination telephone number 458.

Figure 5:
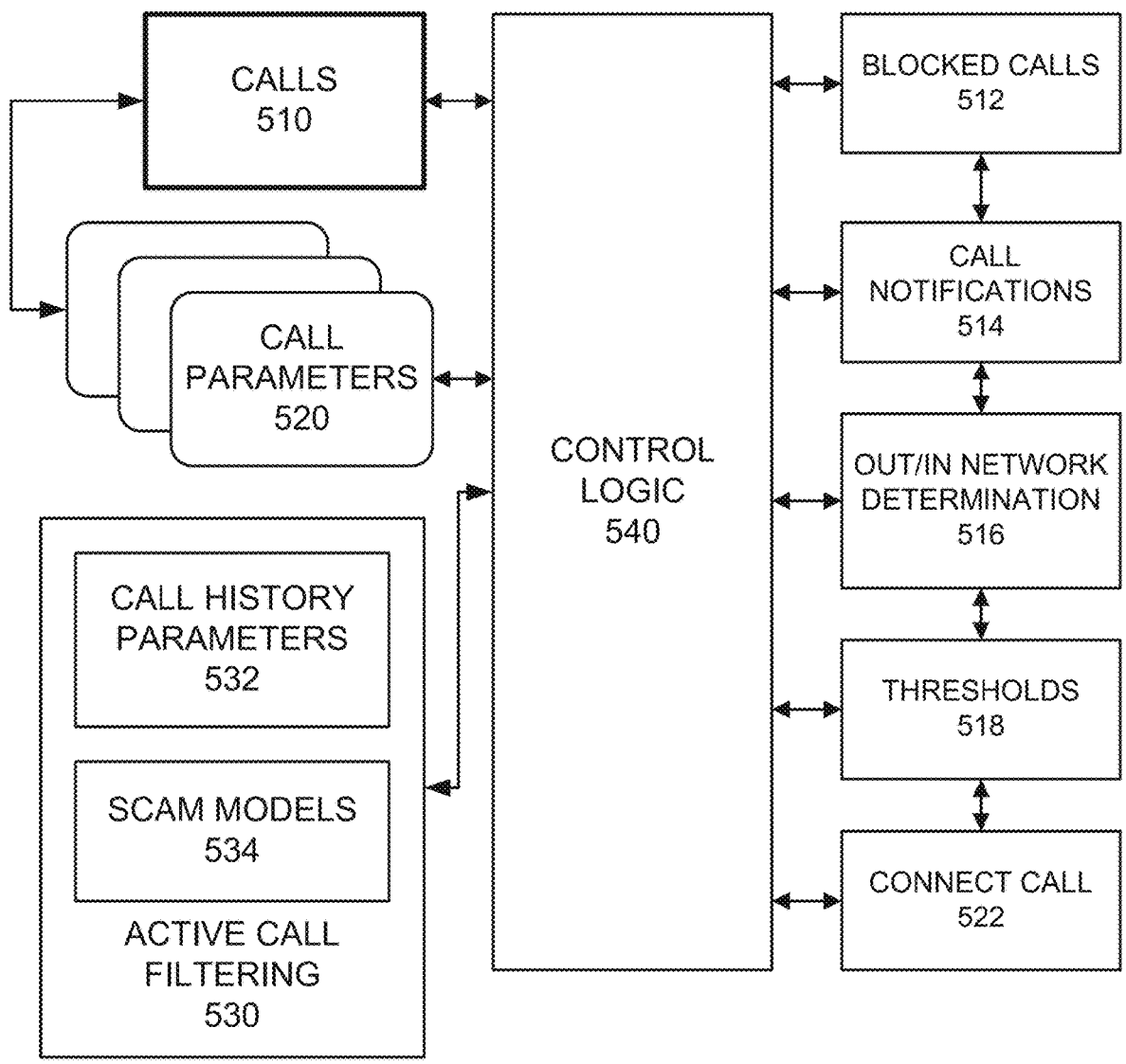
FIG. 5 illustrates a logic diagram with example data input and output parameters for performing call processing according to example embodiments.

FIG. 5 illustrates a logic diagram with example data input and output parameters for performing call processing according to example embodiments. Referring to FIG. 5, the logic module configuration 500 may include a processing unit or processor 540 which receives various inputs, such as calls 510, call parameters 520, filtering criteria, such as call history parameters 532, scam models 534 and other active call filtering 530 criteria. The output information may include blocked calls 512, call notifications 514, out/in network determinations for call origination 516, thresholds for time, number of calls and other call filtering criteria 518 and a connected call 522 when the calls are deemed valid or the subscriber does not accept the scam notifications.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
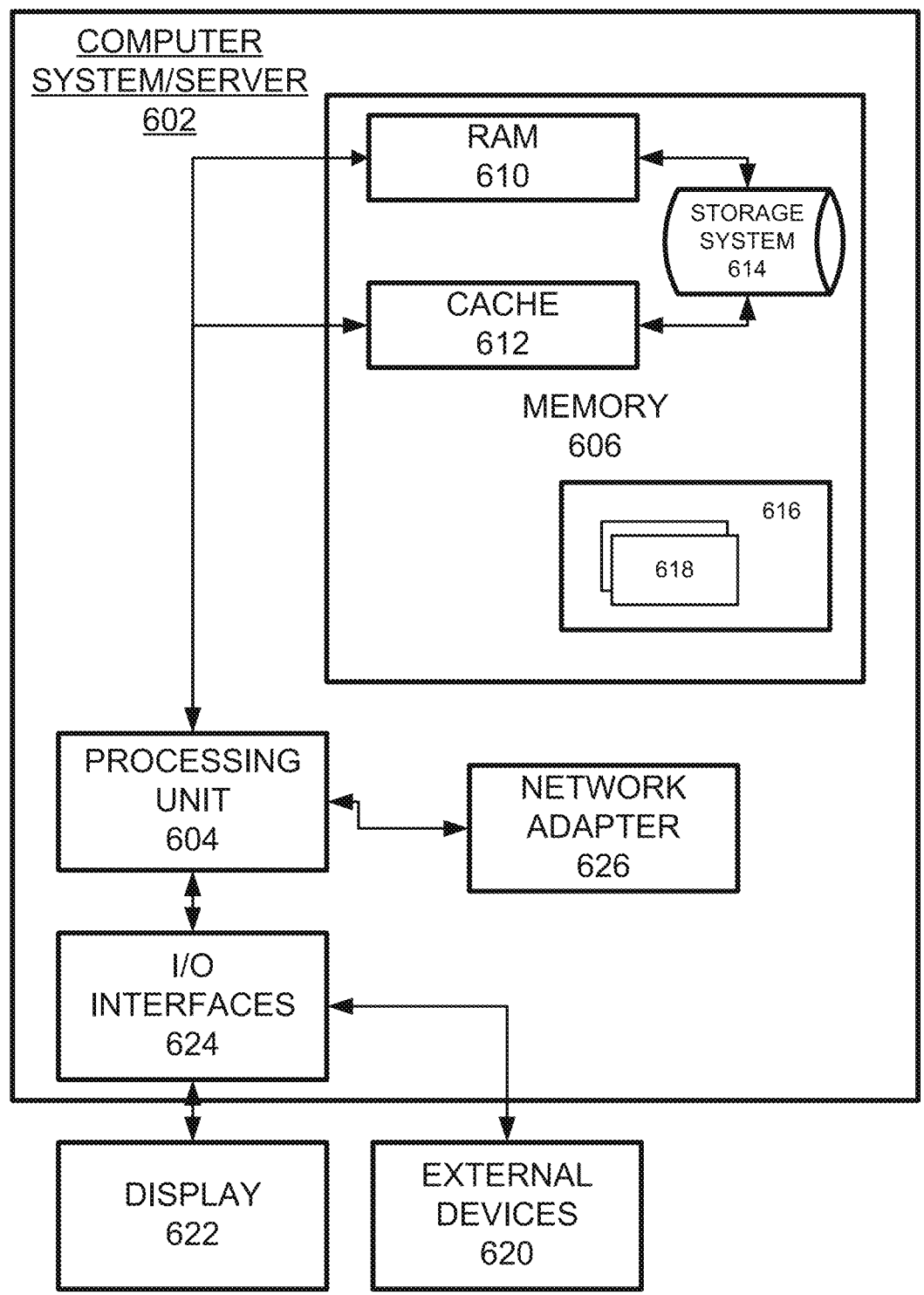
FIG. 6 illustrates an example network entity device configured to store instructions, software, and corresponding hardware for executing the same, according to example embodiments of the present application.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    determining an outbound call placed by a mobile device is destined for a destination telephone number that was stored a plurality of times in a call history of the mobile device and within a threshold amount of time;
    determining whether the destination telephone number is a scam call suspect telephone number based on the plurality of instances the destination telephone number was stored in the mobile device call history, as both a called telephone number and a call received telephone number, being less than a threshold number of instances within the threshold amount of time;
    determining the destination telephone number is a scam call suspect when the telephone number is not stored in the mobile device call history the threshold number of times as a called telephone number and a call received telephone number; and
    forwarding a scam call notification to the mobile device during the outbound call and prior to connecting the call between the mobile device and a destination telephone number device.

2. The method of claim 1, determining whether the destination telephone number has additional instances stored in the call history of the mobile device.

3. The method of claim 2, wherein when a number of the additional instances meets or exceeds the threshold number of telephone number instances in the call history of the mobile device, permitting the outbound call to connect and revoking the scam call notification.

4. The method of claim 1, wherein the determining the destination telephone number is a scam call suspect telephone number is based on one or more call filtering parameters.

5. The method of claim 4, wherein the one or more call filtering parameters comprise one or more of a calling telephone number, an IP address of the calling device and an IP address of one or more network devices forwarding call requests comprising the calling telephone number.

6. The method of claim 1, comprising
    responsive to forwarding the scam call notification to the mobile device while the outbound call is dialing the destination telephone number, blocking the outbound call from connecting with the destination telephone number.

7. The method of claim 1, comprising
    determining the destination telephone number stored in the call history is not assigned to a calling device that previously placed a call to the mobile device.

8. An apparatus, comprising:
    a processor configured to
        determine an outbound call placed by a mobile device is destined for a destination telephone number that was stored a plurality of times in a call history of the mobile device and within a threshold amount of time;
        determine whether the destination telephone number is a scam call suspect telephone number based on the plurality of instances the destination telephone number was stored in the mobile device call history, as both a called telephone number and a call received telephone number, being less than a threshold number of instances within the threshold amount of time;
        determine the destination telephone number is a scam call suspect when the telephone number is not stored in the mobile device call history the threshold number of times as a called telephone number and a call received telephone number; and
    a transmitter configured to forward a scam call notification to the mobile device during the outbound call and prior to connecting the call between the mobile device and a destination telephone number device.

9. The apparatus of claim 8, wherein the processor is configured to determine whether the destination telephone number has additional instances stored in the call history of the mobile device.

10. The apparatus of claim 9, wherein when a number of the additional instances meets or exceeds the threshold number of telephone number instances in the call history of the mobile device, the processor permits the outbound call to connect and revoke the scam call notification.

11. The apparatus of claim 8, wherein the determination that the destination telephone number is a scam call suspect telephone number is based on one or more call filtering parameters.

12. The apparatus of claim 11, wherein the one or more call filtering parameters comprise one or more of a calling telephone number, an IP address of the calling device and an IP address of one or more network devices forwarding call requests comprising the calling telephone number.

13. The apparatus of claim 8, wherein the processor is further configured to perform responsive to the scam call notification being forwarded to the mobile device while the outbound call is dialing the destination telephone number, block the outbound call from connecting with the destination telephone number.

14. The apparatus of claim 8, wherein the processor is further configured to determine the destination telephone number stored in the call history is not assigned to a calling device that previously placed a call to the mobile device.

15. A non-transitory computer readable storage medium configured to store instructions that when executed cause a processor to perform:
    determining an outbound call placed by a mobile device is destined for a destination telephone number that was stored a plurality of times in a call history of the mobile device and within a threshold amount of time;
    determining whether the destination telephone number is a scam call suspect telephone number based on the plurality of instances the destination telephone number was stored in the mobile device call history, as both a called telephone number and a call received telephone number, being less than a threshold number of instances within the threshold amount of time;
    determining the destination telephone number is a scam call suspect when the telephone number is not stored in the mobile device call history the threshold number of times as a called telephone number and a call received telephone number; and
    forwarding a scam call notification to the mobile device during the outbound call and prior to connecting the call between the mobile device and a destination telephone number device.

16. The non-transitory computer readable storage medium of claim 15, wherein the processor is further configured to perform:

determining whether the destination telephone number has additional instances stored in the call history of the mobile device.

17. The non-transitory computer readable storage medium of claim 16, wherein when a number of the additional instances meets or exceeds the threshold number of telephone number instances in the call history of the mobile device, permitting the outbound call to connect and revoking the scam call notification.

18. The non-transitory computer readable storage medium of claim 15, wherein the determining the destination telephone number is a scam call suspect telephone number is based on one or more call filtering parameters.

19. The non-transitory computer readable storage medium of claim 18, wherein the one or more call filtering parameters comprise one or more of a calling telephone number, an IP address of the calling device and an IP address of one or more network devices forwarding call requests comprising the calling telephone number.

20. The non-transitory computer readable storage medium of claim 15, wherein the processor is further configured to perform:
    responsive to forwarding the scam call notification to the mobile device while the outbound call is dialing the destination telephone number, blocking the outbound call from connecting with the destination telephone number.

* * * * *